(12) United States Patent
Nishimura

(10) Patent No.: US 12,521,822 B2
(45) Date of Patent: Jan. 13, 2026

(54) SN SOLDER PASTE COMPRISING CU-CO METAL PARTICLES

(71) Applicant: NIHON SUPERIOR CO., LTD., Osaka (JP)

(72) Inventor: Tetsuro Nishimura, Osaka (JP)

(73) Assignee: NIHON SUPERIOR CO., LTD., Osaka (JP)

( * ) Notice: Subject to any disclaimer, the term of this patent is extended or adjusted under 35 U.S.C. 154(b) by 230 days.

(21) Appl. No.: 17/639,544

(22) PCT Filed: Sep. 2, 2020

(86) PCT No.: PCT/JP2020/033346
§ 371 (c)(1),
(2) Date: Mar. 1, 2022

(87) PCT Pub. No.: WO2021/045131
PCT Pub. Date: Mar. 11, 2021

(65) Prior Publication Data
US 2022/0297243 A1  Sep. 22, 2022

(30) Foreign Application Priority Data
Sep. 2, 2019 (JP) .................. 2019-159862

(51) Int. Cl.
*B23K 35/02* (2006.01)
*B23K 35/30* (2006.01)
(Continued)

(52) U.S. Cl.
CPC .......... *B23K 35/025* (2013.01); *B23K 35/302* (2013.01); *C22C 9/06* (2013.01); *B23K 2103/12* (2018.08)

(58) Field of Classification Search
CPC .............. B23K 2103/12; B23K 35/025; B23K 35/262; B23K 35/302; B23K 35/3033; B23K 35/3046; C22C 9/06
See application file for complete search history.

(56) References Cited

U.S. PATENT DOCUMENTS

| 7,800,230 B2 | 9/2010 | Hirano et al. |
| 2005/0029666 A1 | 2/2005 | Kurihara et al. |
| (Continued) | | |

FOREIGN PATENT DOCUMENTS

| CN | 103805795 B | * | 9/2015 |
| CN | 104985350 A | | 10/2015 |
| (Continued) | | | |

OTHER PUBLICATIONS

CNIPA; Application No. 202080061477.4; Notification of First Office Action dated Dec. 20, 2022.
(Continued)

*Primary Examiner* — Keith Walker
*Assistant Examiner* — Carlos J Gamino
(74) *Attorney, Agent, or Firm* — WHDA, LLP

(57) ABSTRACT

By using a solder paste including powder of a lead-free solder alloy mainly composed of Sn and a metal particle with a melting point higher than a melting point of the lead-free solder alloy, in which the metal particle is formed of a Cu—Ni alloy having a Ni content of 0.1 to 90% by mass, or formed of a Cu—Co alloy having a Co content of 0.1 to 90% by mass, a solder bonded body that has heat resistance, thermal conductivity, and reliability higher than ever can be formed.

7 Claims, 8 Drawing Sheets

(51) Int. Cl.
*C22C 9/06* (2006.01)
*B23K 103/12* (2006.01)

(56) References Cited

U.S. PATENT DOCUMENTS

| | | | |
|---|---|---|---|
| 2013/0233618 A1* | 9/2013 | Nakano | C22C 1/0483 228/101 |
| 2013/0270001 A1* | 10/2013 | Nakano | C22C 22/00 174/84 R |
| 2013/0299236 A1* | 11/2013 | Nakano | B23K 35/0238 228/249 |
| 2015/0072165 A1* | 3/2015 | Sunaga | C25D 3/56 205/95 |
| 2015/0239069 A1 | 8/2015 | Nakano et al. | |
| 2019/0001408 A1 | 1/2019 | Kawaguchi et al. | |
| 2019/0001444 A1 | 1/2019 | Kawaguchi et al. | |
| 2019/0019594 A1* | 1/2019 | Ishii | B22F 1/102 |
| 2020/0013673 A1* | 1/2020 | Zierath | H01L 23/53233 |

FOREIGN PATENT DOCUMENTS

| | | | | |
|---|---|---|---|---|
| JP | 2005-161338 A | 6/2005 | | |
| JP | 5369682 B2 | 12/2013 | | |
| JP | 2014-028380 A | 2/2014 | | |
| JP | 2017-170527 A | 9/2017 | | |
| WO | 03/021664 A1 | 3/2003 | | |
| WO | WO-2015079844 A1 * | 6/2015 | | B23K 1/0008 |
| WO | 2017/154329 A1 | 9/2017 | | |
| WO | 2017/154330 A1 | 9/2017 | | |

OTHER PUBLICATIONS

CNIPA; Application No. 202080061477.4; Second review opinion notice dated Oct. 11, 2023.

* cited by examiner

SN SOLDER PASTE COMPRISING CU-CO METAL PARTICLES

CROSS-REFERENCE TO RELATED APPLICATIONS

This application is a U.S. national phase application filed under 35 U.S.C. § 371 of International Application No. PCT/JP2020/033346, filed Sep. 2, 2020, which is based upon and claims the benefit of priority from the prior Japanese Application No. 2019-159862, filed Sep. 2, 2019.

FIELD

The present invention relates to a solder paste and a solder bonded body.

BACKGROUND

In the past, for example, when an electronic part such as a power conversion element is fixed to a copper substrate, the method is sometimes employed in which a solder paste or a solder sheet is disposed in a necessary position followed by soldering it by heating with a reflow furnace or the like. In the soldering method using the reflow method like this, the solder that is melted by heating is pushed out from between the members to be bonded due to the own weight of the electronic part or the like, thereby sometimes resulting in a decrease in the bonding strength. In addition, when an electronic part is bonded to a wiring substrate by a solder bump, the bump's height can be irregular, thereby sometimes bonding the electronic part to the substrate slantingly. When bonded in this the part where the bump height is low receives a thermal stress as a result of long use, and thereby sometimes resulting in a crack or the like in the bump. In addition to the failure occurred at the time of soldering, under the condition in which a solder bonding portion of the electronic part is exposed to a high temperature when working at a high temperature, the solder bonding portion becomes soft (hardness and strength are decreased as compared with normal temperature), so that the height of the solder bonding portion changes to be irregular due to the own weight of the bonding part or due to an outer force such as vibration, thereby sometimes resulting in poor bonding.

To cope with these problems, for example, a composite material having metal particles dispersed in a solder alloy has been proposed (Patent Literatures 1 to 3).

Patent Literature 1 discloses the lead-free formed solder that is mainly composed of Sn and has high-melting point metal particles dispersed in a plate-like solder, in which the metal particle is of Ni or Cu, melting point thereof is higher than the melting point of the solder alloy by 300° C. or more, the particle diameter thereof is in the range of 20 to 300 μm, a fluctuation of the particle diameter of the high-melting point metal particle is within 40% of the particle diameter thereof, an alloy layer formed of the main solder component and of the high-melting point metal particles is formed around the high-melting point metal particle, and the alloy layer is at least one alloy layer selected from the group consisting of $Ni_3Sn$, $Ni_3Sn_2$, and $Ni_3Sn_4$ when the metal particle is of Ni, and from the group consisting of $Cu_3Sn$ and $Cu_6Sn_5$ when the metal particle is of Cu. It is described that when a semiconductor element is soldered with a substrate on the basis of the composition as described above, because the semiconductor element and the substrate are not bonded slantingly, there is no decrease in the bonding strength due to a shortage of the solder amount, and because an alloy layer with the solder is formed around the metal particle, the bonding strength with the metal particle is increased.

Patent Literature 2 discloses the solder sheet that has metal balls, the melting point of which is higher than the solder that forms a matrix, dispersed therein, in which the average value of the diameter of the metal ball is in the range of 30 to 300 μm, and a standard deviation of the diameter distribution is 2.0 μm or less. It is described that because the composition like this enables to properly keep the distance between the substrate's electrode portion and the electronic part's terminal (stand-off height), the thickness of the solder layer that disturbs thermal conduction can be suppressed as far as possible in the region where the thermal expansion difference between the substrate and the electronic member is relaxed.

Patent Literature 3 discloses a semiconductor device in which a solder layer having a chip part and a wiring member bonded is sealed with a resin, and in which the solder layer is formed of a composite body having metal powders dispersed in a matrix metal, the melting point of the metal powders being higher than that of the matrix metal. It is described that the composition like this can provide the semiconductor device in which a chip part as a circuit element is mounted on a substrate, and when the semiconductor device having the mounted chip part sealed with a resin is mounted on an outer wiring substrate, running-out of a first mounted solder material, as well as short circuit or breakage of the wiring, or misalignment of the chip part due to the running-out, can be prevented.

CITATION LIST

Patent Literature

Patent Literature 1: Japanese Patent No. 5369682
Patent Literature 2 Japanese Patent Application Laid-open No. 2005-161338
Patent Literature 3: WO2003/021664

SUMMARY

In recent years, SiC and GaN having superior switching characteristics and the like are receiving an attention as a material of a power semiconductor because of the characteristics thereof. Therefore, for example, in a power module or the like using a SiC semiconductor, the temperature at which the working characteristics can be utilized is high, so that in the solder alloy with which a power module or the like is bonded onto a substrate, heat resistance, thermal conductivity, and reliability higher than ever are increasingly required. In addition, as the fifth-generation communication technologies come into play, massive data is exchanged between communication terminals. Thus, also in the solder alloy that is used in the bonding portion between the printed substrate of a communication terminal and the terminal of an electronic part, heat resistance, thermal conductivity, and reliability higher than ever are increasingly required.

The inventor of the present invention has carried out an extensive investigation on the solder alloy having high heat resistance, thermal conductivity, and reliability, and as a result, has found that depositing an intermetallic compound in the solder alloy is effective as the solder alloy that can have these characteristics (Japanese Patent Application Laid-open No. 2011-41970). The solder alloy like this can satisfy the market requirements to a certain degree, but there still remains a room for improvement.

In the invention described in Patent Literature 1, it is described that the high-melting point metal particle is formed of Ni or of Cu, and the alloy layer formed of the metal particle and Sn, which is a main component of the solder, is at least one alloy selected from the group consisting of $Ni_3Sn$, $Ni_3Sn_2$, and $Ni_3Sn_4$, or from the group consisting of $Cu_3Sn$ and $Cu_6Sn_5$. However, according to the investigation by the inventor of the present invention, for example, when the metal particle is formed of Ni, the wetting property thereof to a lead-free solder alloy mainly composed of Sn is so low that there is a case that the alloy layer is not satisfactorily formed. Furthermore, when the metal particle is of Cu, it is confirmed that the Kirkendall void is formed due to the imbalance of interdiffusion at the interface between Sn and Cu caused by heating thereby leading to the decreases in the thermal conductivity and the bonding strength.

In the invention described in Patent Literature 2, a metal ball mainly composed of Ni is used as the preferable metal ball. However, Patent Literature 2 discloses only a solder sheet formed with rolling the solder bands that is thinly rolled in advance, with simultaneously charging the metal balls into between these bands; therefore, there is no intermetallic compound present in the solder sheet thus obtained. On top of this, Patent Literature 2 discloses only the sheet that is formed by using a pure Ni metal piece as the metal ball mainly composed of Ni. In addition, as described above, the metal ball formed of Ni has a poor wetting property to the lead-free solder alloy mainly composed of Sn, so that there is a case that the intermetallic compound is not satisfactorily formed.

In the invention described in Patent Literature 3, the solder layer composed of a composite body, which has metal powders formed of various alloys dispersed in the matrix metal formed of various solder alloys including a lead-free solder alloy, is disclosed in Examples. However, Patent Literature 3 does not pay attention to the intermetallic compound, although the paste-like solder material formed of a solder alloy and metal powders is disclosed. In addition, in the metal powder clearly indicated in Patent Literature 3, there still remains a room for improvement in order to satisfy high performance requirements from the market.

An object of the present invention is to provide a solder paste capable of forming a solder bonded body including a solder bonding portion having heat resistance, thermal conductivity, and reliability higher than ever. In addition, the present invention has an object to provide a solder bonded body having the solder bonding portion as described above.

The inventor of the present invention has carried out an extensive investigation to solve the problems described above, and as a result, has found that the problems described above can be solved when a metal particle of a specific Cu—Ni alloy is made to present in a lead-free solder alloy mainly composed of Sn, or when a metal particle of a specific Cu—Co alloy is made to present in a lead-free solder alloy composed of mainly Sn and containing Ni.

A first aspect of the present invention relates to a solder paste including powder of a lead-free solder alloy mainly composed of Sn and a metal particle with a melting point higher than a melting point of the lead-free solder alloy, in which the metal particle is formed of a Cu—Ni alloy having a Ni content of 0.1 to 90% by mass, or formed of a Cu—Co alloy having a Co content of 0.1 to 90% by mass.

A second aspect of the present invention relates to a solder bonded body including a solder bonding portion formed by using the above-mentioned solder paste, in which in the solder bonding portion, in an interface between the metal particle and a solder, $(Cu,Ni)_6Sn_5$ or $(Cu,Co)_6Sn_5$ is formed, or a particle having an alloy that forms the metal particle displaced by $(Cu,Ni)_6Sn_5$ or $(Cu,Co)_6Sn_5$ is formed.

The solder paste according to the present invention is capable of forming the solder bonded body having heat resistance, thermal conductivity, and reliability higher than ever.

DESCRIPTION OF EMBODIMENTS

Figure 1:
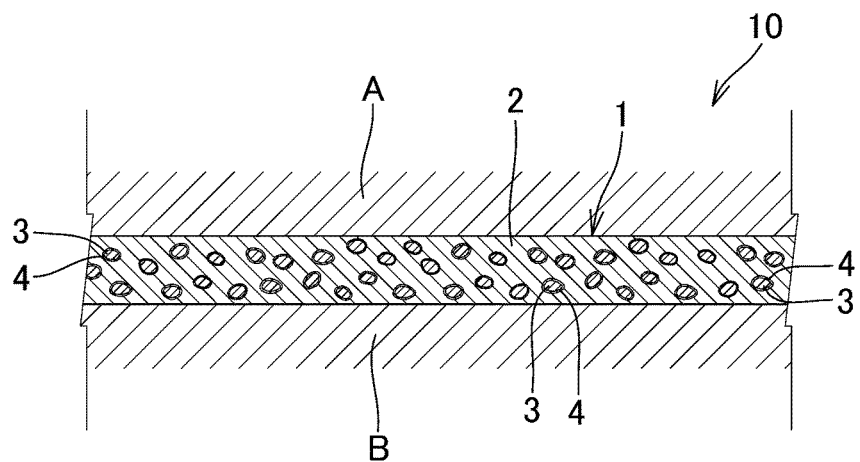
FIG. 1 is a cross-sectional view in the thickness direction in order to explain the structure of the solder bonded body formed by using the solder paste accord in to the embodiment.

A solder paste according to an embodiment of the present invention includes powder of a lead-free solder alloy mainly composed of Sn (hereinafter, this is sometimes called "solder alloy" or "lead-free solder alloy") and a metal particle with a melting point higher than a melting point of this solder alloy (hereinafter, sometimes this metal particle is simply called "metal particle"). Here, the metal particle is formed of a Cu—Ni alloy having a Ni content of 0.1 to 90% by mass, or of a Cu—Co alloy having a Co content of 0.1 to 90% by mass.

As described above, when the metal particle formed of the Cu—Ni alloy having a Ni content of 0.1 to 90% by mass, or of the Cu—Co alloy having a Co content of 0.1 to 90% by mass is included, due to the heat treatment at the time of forming a solder bonded body, $(Cu,Ni)_6Sn_5$ or $(Cu,Co)_6Sn_5$ can be stably formed, in the interface between the metal particle and the solder, as the intermetallic compound, which is the compound between the lead-free solder alloy mainly composed of Sn and the metal particle, or the particle having the alloy that forms the metal particle displaced with $(Cu,Ni)_6Sn_5$ or $(Cu,Co)_6Sn_5$ can be formed. The reason for this is presumed as follows. Namely, when the metal particle is formed of the Cu—Ni alloy whose Ni content is within the specific range, Sn in the molten solder alloy can be diffused into the metal particle more stably than the particle of Cu or Ni, so that $(Cu,Ni)_6Sn_5$ is stably formed. Also in the case that the metal particle is formed of the Cu—Co alloy whose Co content is within the specific range, it is presumed that $(Cu,Co)_6Sn_5$ is stably formed because Co has the properties similar to those of Ni. Therefore, during the time of heat treatment, an oxide film and the like on the surface of the metal particle are removed by a flux agent that is included in the solder paste. As a result, when the surface thereof contacts with the molten solder alloy, in accordance with the various conditions (for example, a heat-treatment condition, a composition and a size of the metal particle), $(Cu,Ni)_6Sn_5$ or $(Cu,Co)_6Sn_5$ is stably formed in the interface between the metal particle and the solder, or the particle having the alloy that forms the metal particle displaced with $(Cu,Ni)_6Sn_5$ or $(Cu,Co)_6Sn_5$ is formed. Also, not only the melting point of $(Cu,Ni)_6Sn_5$ is 415° C., but also, contrary to $Cu_6Sn_5$, there is no η-η' phase change occurs at 186° C. When the η-η' phase change occurs, this causes the change in volume, resulting in concentration of the stress to the solder bonding portion, which can cause a damage thereof. However, because there is no phase change like this occurs in $(Cu,Ni)_6Sn_5$, that is, because there is no phase change occurs even when the solder bonding portion is exposed to high temperature of equal to or higher than 186° C. followed by cooling, the concentration of the stress to the solder bonding portion can be suppressed. Accordingly, also in view of these points, the solder bonded body having an excellent reliability can be provided. Because Co has the properties similar to those of Ni, it is presumed that $(Cu,Co)_6Sn_5$ can also suppress concentration of the stress to the solder bonding portion thereby enabling to provide the solder bonded body having excellent reliability.

As described above, the metal particle that is formed of a specific Cu—Ni alloy can stably form the $(Cu,Ni)_6Sn_5$ in the interface thereof with the solder, or the particle having the metal particle displaced with $(Cu,Ni)_6Sn_5$ can be formed. Also, the metal particle that is formed of a specific Cu—Co alloy can stably form the $(Cu,Co)_6Sn_5$ in the interface thereof with the solder. As a result, the characteristics based on the heat resistance and the thermal conductivity of $(Cu,Ni)_6Sn_5$ and $(Cu,Co)_6Sn_5$ can be effectively given to the solder bonding portion, namely, to the solder bonded body. Furthermore, even when repeatedly exposed to a high temperature, the Kirkendall void that is formed in the case of the metal particle of Cu can be prevented from forming. As a result, even when used as the solder bonded body for a long period of time, the damage thereof can be suppressed, so that the solder bonded body having a higher reliability than ever can be provided. Here, the $(Cu,Ni)_6Sn_5$ and $(Cu,Co)_6Sn_5$ that are formed in the interface between the metal particle and the solder mean the $(Cu,Ni)_6Sn_5$ and $(Cu,Co)_6Sn_5$ that are formed between the metal particle and the solder and continue to a part or whole of the metal particle surface with contacting thereto. In addition, in the case that the metal particle that is formed of a specific Cu—Co alloy used, when Ni is included in the solder alloy, in addition to $(Cu,Ni)_6Sn_5$, $(Cu,Ni,Co)_6Sn_5$ can also be formed as the intermetallic compound.

When the metal particle formed of the specific Cu—Co alloy and a prescribed lead-free solder alloy powder that contains Ni are used, $(Cu,Ni)_6Sn_5$ and $(Cu,Co)_6Sn_5$ are formed as the intermetallic compounds. In addition, as described before, $(Cu,Ni,Co)_6Sn_5$ can also be formed. Accordingly, the solder paste like this can also provide the solder bonded body having a higher reliability than ever as described above.

The lead-free solder alloy is the alloy mainly composed of Sn. As for the lead-free solder alloy like this, an alloy that is generally usable in this technical field may be used. Illustrative examples thereof include lead-free solder alloys of a. Sn—Ag type, a Sn—Ag—Cu type, a Sn—Zn type, a Sn—Sb type, a Sn—Ag—Bi type, a Sn—Ag—In type, a Sn—Cu—Ni type, a Sn—Ni type, and the like. Among these, the lead-free solder alloys of the Sn—Cu—Ni type and the Sn—Ni type are preferable. Also, these lead-free solder alloys may be added, as appropriate, with Ni, Co, Ge, Ga, Cr, P, Si, Ti, V, Mn, Fe, Zr, Nb, Mo, Pd, Te, Pt, Au, or the like. Also, in the case that the metal particle is the specific Cu—Co alloy, in order to prevent elution of Cu in the metal particle thereby forming $(Cu,Ni)_6Sn_5$ so as to express the functions as described above, there is the case that to use the solder alloy that includes Ni is preferable. In such a case, for example, the lead-free solder alloys of a Sn—Cu—Ni type and an S—Ni type, as well as a Sn—Ag type, a Sn—Ag—Cu type, a Sn—Zn type, a Sn—Sb type, a Sn—Ag—Bi type, or a Sn—Ag—In type to which Ni is added may be used. Also, these lead-free solder alloys may be added, as appropriate, with Co, Ge, Ga, Cr, P, Si, Ti, V, Mn, Fe, Zr, Nb, Mo, Pd, Te, Pt, Au, or the like.

There is no particular restriction in the concentration of Sn in the lead-free solder alloy as far as Sn is a main component therein, namely, as far as the content of Sn is the largest in the lead-free solder alloy.

The metal particle is the one that is formed of the alloy of Cu and Ni, or of the alloy of Cu and Co. When the alloy is formed of Cu and Ni, the content of Ni in the alloy is in the range of 0.1 to 90% by mass, preferably in the range of 5 to 45% by mass, more preferably in the range of 10 to 40% by mass, while especially preferably in the range of 20 to 35% by mass. When the alloy is formed of Cu and. Co, the content of Co in the alloy is in the range of 0.1 to 90% by mass, preferably in the range of 5 to 45% by mass, more preferably in the range of 10 to 40% by mass, while especially preferably in the range of 20 to 35% by mass. In the case of the Cu—Ni alloy, when the content of Ni is within this range, or in the case of the Cu—Co alloy, when the content of Co is within this range, $(Cu,Ni)_6Sn_5$ or $(Cu,Co)_6Sn_5$ is stably formed, in the interface between the metal particle and the solder, as the intermetallic compound, which is the compound between the lead-free solder alloy mainly composed of Sn and the metal particle, or the particle having the alloy that forms the metal particle displaced with $(Cu,Ni)_6Sn_5$ or $(Cu,Co)_6Sn_5$ is formed. As described before, when the metal particle is formed of the alloy of Cu and Co and the solder alloy powder includes Ni, as the intermetallic compound, $(Cu,Ni)_6Sn_5$ and $(Cu,Co)_6Sn_5$ are formed, or in addition to these, $(Cu,Ni,Co)_6Sn_5$ can be formed.

In the case that the metal particle is the alloy of Cu and Ni, when the content of Ni in the alloy is in the range of 0.1 to 10% by mass, especially in the range of 2 to 10% by mass, there is a tendency that $(Cu,Ni)_6Sn_5$ can be readily formed, and that the metal particle of the Cu—Ni alloy is readily displaced with the particle of $(Cu,Ni)_6Sn_5$. Furthermore, depending on the heating condition and the thermal history, when the average particle diameter of the metal particle is less than 10 μm, there is a tendency that the metal particle of the Cu—Ni alloy becomes the particle of $(Cu,Ni)_6Sn_5$. The particle of $(Cu,Ni)_6Sn_5$ has a higher melting point than the solder alloy, and has a superior bonding strength to the solder alloy, so that in the solder bonding portion, the same function as the metal particle of the Cu—Ni alloy and of the Cu—Co alloy can be expressed.

The size of the metal particle may be any as far as the particle can serve as the nucleus in the formation of the intermetallic compound. For example, the average particle diameter thereof may be 5 μm or greater. The upper limit of the average particle diameter may be determined as appropriate in accordance with the distance between the parts to be bonded, the bonding strength of the solder, the members to be bonded, and the like. In the case that the metal particle is the Cu—Ni alloy and the nucleus of the Cu—Ni alloy is intended to be remained as described above, the average particle diameter may be, for example, 10 μm or greater, depending on the Ni content. There is no particular restriction in the fluctuation of the particle, and the particle may be sieved as necessary. There is no particular restriction in the shape of the metal particle, and a heretofore known shape in this technical field may be used.

There is no particular restriction in the content of the metal particle in the solder paste. This may be determined as appropriate on the basis of the relationship among the bonding strength, and also the heat resistance, thermal conductivity, and reliability expressed by the presence of the intermetallic compound, which are required in accordance with the use thereof.

The metal particle as described above may be prepared by a heretofore known method. Alternatively, a commercially available product may be used as well.

In order to remove and clean an oxide film and so forth from the surfaces of the solder alloy and of the part to be bonded thereby enabling to bond the solder with the part to be bonded, the solder paste generally includes flux agent.

The flux agent includes, as the composition components, a resin, a solvent, an activating agent, and a thixotropic agent.

Illustrative examples of the resin include rosins (acid-modified rosin, hydrogenated rosin, disproportionated rosin, polymer rosin, and rosin ester), a phenol-modified resin, and an acrylic resin, and the rosins may be used singly or as a mixture of two or more of them.

There is no particular restriction in the solvent, and the solvents that are generally used in this technical field may be used. Illustrative examples of the solvent include alcohols such as ethyleneglycol monomethyl ether, ethyleneglycol monoethyl ether, ethyleneglycol monobutyl ether, diethyleneglycol monomethyl ether, diethyleneglycol monoethyl ether, 2-propanol, decanol, isobornyl cyclohexanol (MTPH), octanediol, and 2-hexyl-1-decanol; glycols such as butylcarbitol, dibutylcarbitol, hexylene glycol, hexylene diglycol, and tripropylene glycol monobutyl ether; esters such as butyl benzoate and dibutyl maleate; hydrocarbons such as n-hexane and dodecane; and terpene derivatives such as terpineol, 1,8-terpin monoacetate, and 1,8-terpin diacetate. These solvents may be used singly or as a mixture of two or more of them.

There is no particular restriction in the activating agent, and the activating agents that are generally used in this technical field may be used. Illustrative examples of the activating agent include bisamides such as ethylenebisstearic acid amide and hexamethylenebishydroxystearic acid amide; monoamides such as hydroxystearic acid amide; and hydrogenated castor oil. These activating agents may be used singly or as a mixture of two or more of them.

The flux agent may include, besides the flux components described above, components that can be added to a usual solder paste, such as a viscosity-controlling agent and an antioxidant.

Contents of the above-mentioned components that are included in the flux agent may be determined as appropriate.

The solder bonded body according to the embodiment of the present invention includes the solder bonding portion that is formed by using the solder paste described above. Here, around the surface of the metal particle that is included in the solder paste, $(Cu,Ni)_6Sn_5$ or $(Cu,Co)_6Sn_5$, which is the intermetallic compound, is formed, or the particle having the alloy that forms the metal particle displaced with $(Cu,Ni)_6Sn_5$ or $(Cu,Co)_6Sn_5$ is formed. The metal particle having these intermetallic compounds formed in the interface thereof with the solder, or the particle of the intermetallic compound, can be obtained by wetting a prescribed metal particle with a prescribed molten solder alloy. In other words, these are formed during the time when the solder bonded body is formed by using the above-described solder paste.

Formation of the solder bonded body may be carried out by a heretofore known method such as the reflow method using the above-described solder paste.

The solder bonded body according to the embodiment will be explained below with referring to the drawings. FIG. 1 is the cross-sectional view that is cut-out in the thickness direction in order to explain the structure of the solder bonded body 10. As depicted in FIG. 1, the solder bonded body 10 includes a substrate A, a substrate B, and a solder bonding portion 1 formed by using the solder paste that bonds the substrate A and the substrate B. In the solder bonding portion 1 in the present embodiment, the metal particles 3 having $(Cu,Ni)_6Sn_5$ (symbol 4) formed in the interface thereof with the solder are dispersed in the lead-free solder 2 that is formed of the alloy mainly composed of Sn. In the embodiment illustrated in FIG. 1, the metal particles 3 are dispersed in the solder 2. The metal particles 3 having $(Cu,Ni)_6Sn_5$ (symbol 4) formed in the interface thereof with the solder are present closely to each other, so that the thermal conductivity due to $(Cu,Ni)_6Sn_5$ (symbol 4) can be expressed more effectively. Therefore, it is presumed that, for example, the heat-releasing characteristic in the solder bonding portion of the electronic part that works at high temperature region is excellent thereby having the excellent heat resistance. Also, at the time of solder bonding, it is presumed that owing to the thermal conductivity thereof, dissolution by heating spreads instantly to the entire solder alloy thereby effectively suppressing residence of the void in the solder alloy bulk, so that this, together with the characteristic of $(Cu,Ni)_6Sn_5$ (symbol 4) that the η-η' phase change does not take place, contributes to the increase in the reliability of the solder bonded body 10 after being cooled.

Because the solder bonded body as described above has excellent heat resistance, thermal conductivity, and reliability, this is extremely suitable for the solder bonding portion of a power module such as, for example, to control driving of a car motor or other electric motors that generate a significantly large heat.

EXAMPLES

The solder paste according to the embodiment of the present invention will be explained on the basis of Examples.

Example 1

The flux agent including 1.2 parts by mass of a solvent (isobornyl cyclohexanol), 0.4 parts by mass of adipic acid, and 0.8 parts by mass of decanol was mixed with 6.8 parts by mass of the metal powder of the Cu—Ni alloy containing 5.5 atm % of Ni (5.1% by mass) and 10.8 parts by mass of powder of the lead-free solder alloy mainly composed of Sn (SN1000C (registered trademark); manufactured by Nihon Superior Co., Ltd.) to prepare the solder paste.

Figure 2:
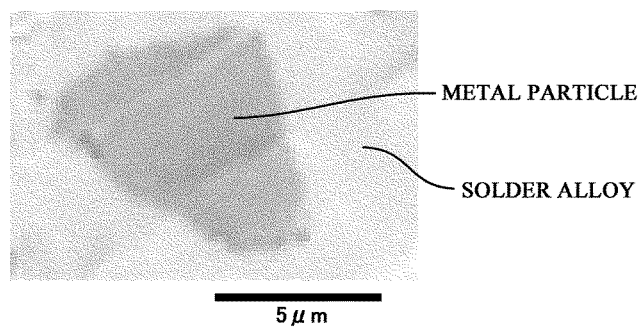
FIG. 2 is a picture, taken by SEM, of a part of the cross section in the thickness direction of the solder bonding portion of the solder paste that is obtained in Example 1.
Figure 3A:
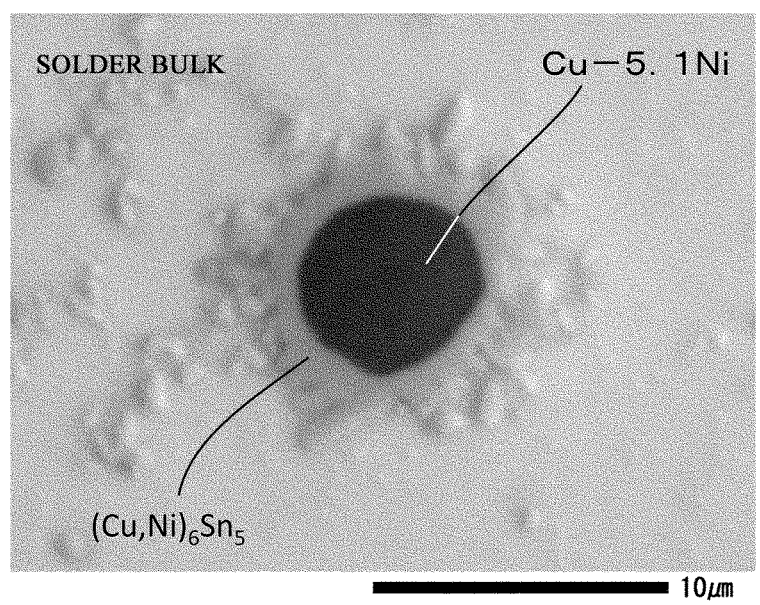
FIG. 3A is a picture, taken by SEM (5000 magnification), of a part of the cross section in the thickness direction of the solder bonded body (observation sample A) including the solder bonding portion formed by using the solder paste that is obtained in Example 2.
Figure 3B:
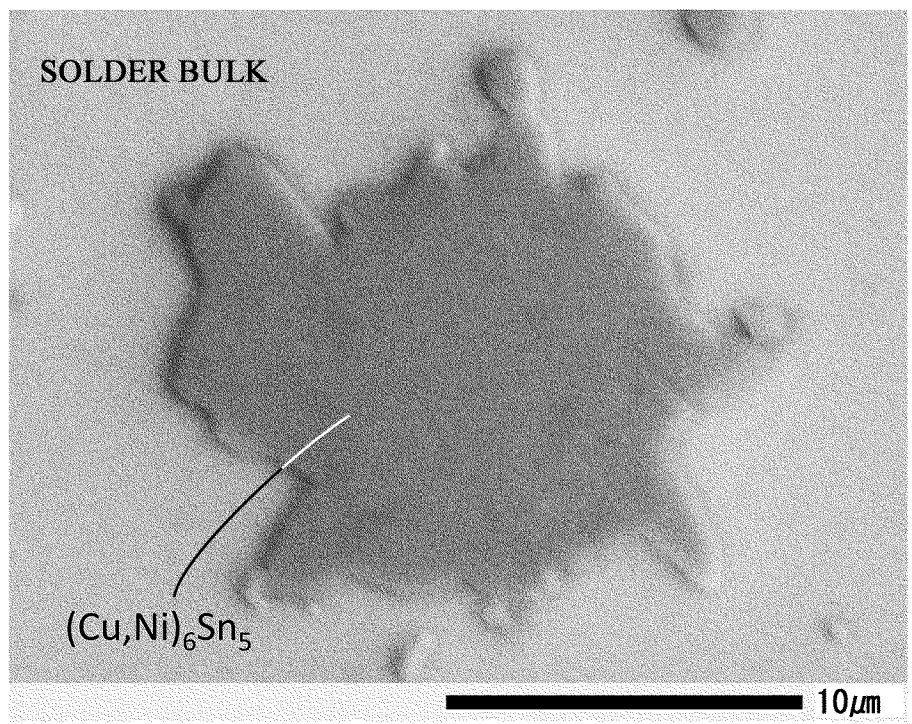
FIG. 3B is a picture, taken by SEM (5000 magnification), of a part of the cross section in the thickness direction of the solder bonded body (observation sample B) including the solder bonding portion formed by using the solder paste that is obtained in Example 2.
Figure 4A:
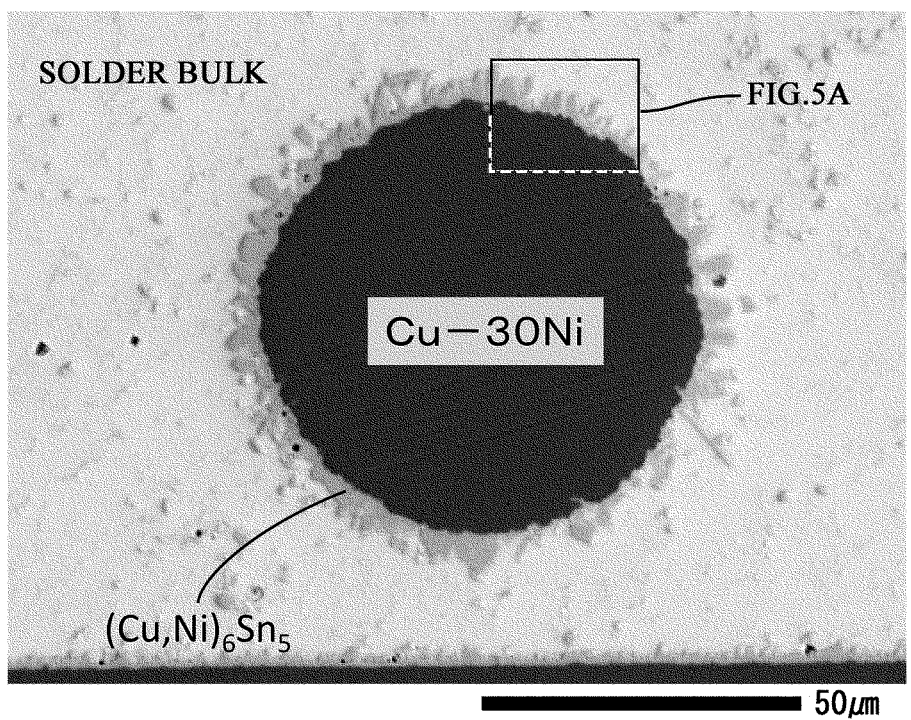
FIG. 4A is a picture, taken by SEM (900 magnification), of a part of the cross section in the thickness direction of the solder bonded body (observation sample A) including the solder bonding portion formed by using the solder paste that is obtained in Example 3.
Figure 4B:
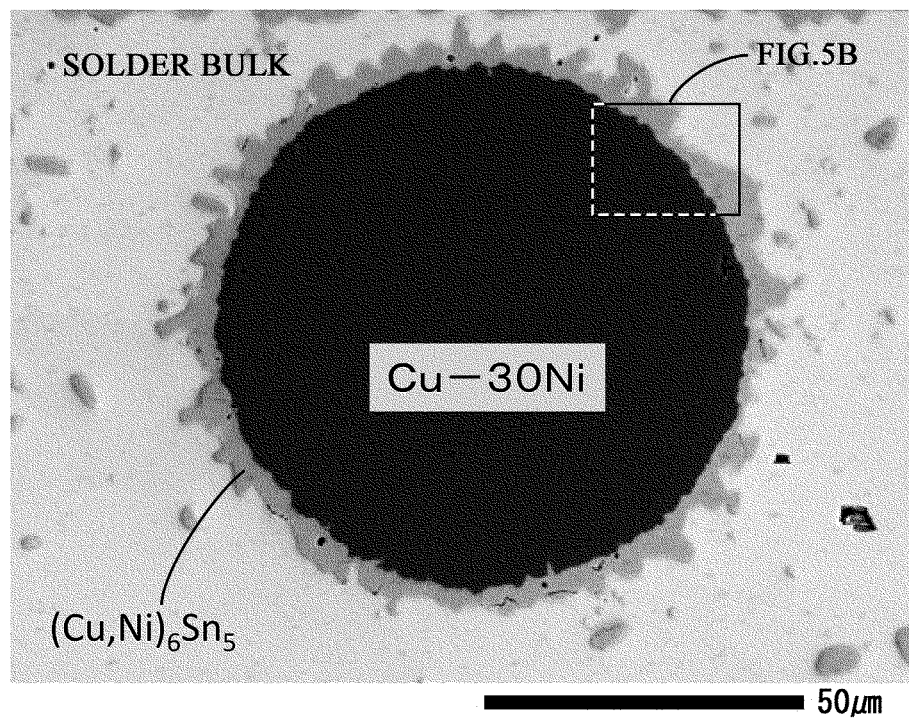
FIG. 4B is a picture, taken by SEM (900 magnification), of a part of the cross section in the thickness direction of the solder bonded body (observation sample B) including the solder bonding portion formed by using the solder paste that is obtained in Example 3.
Figure 5A:
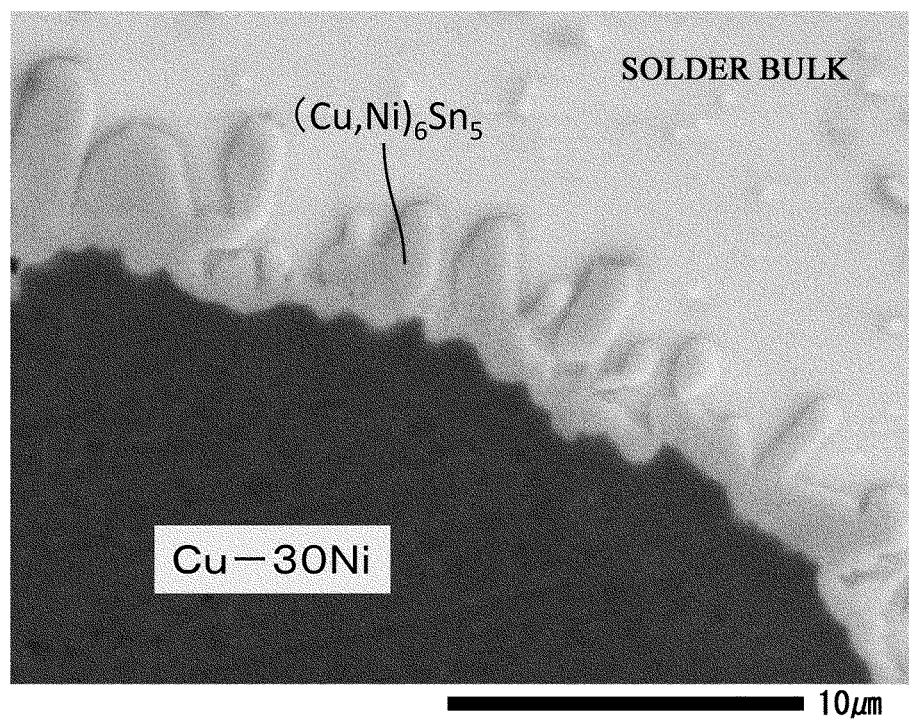
FIG. 5A is an enlarged picture (5000 magnification) of a part (squarely enclosed) of FIG. 4A.
Figure 5B:
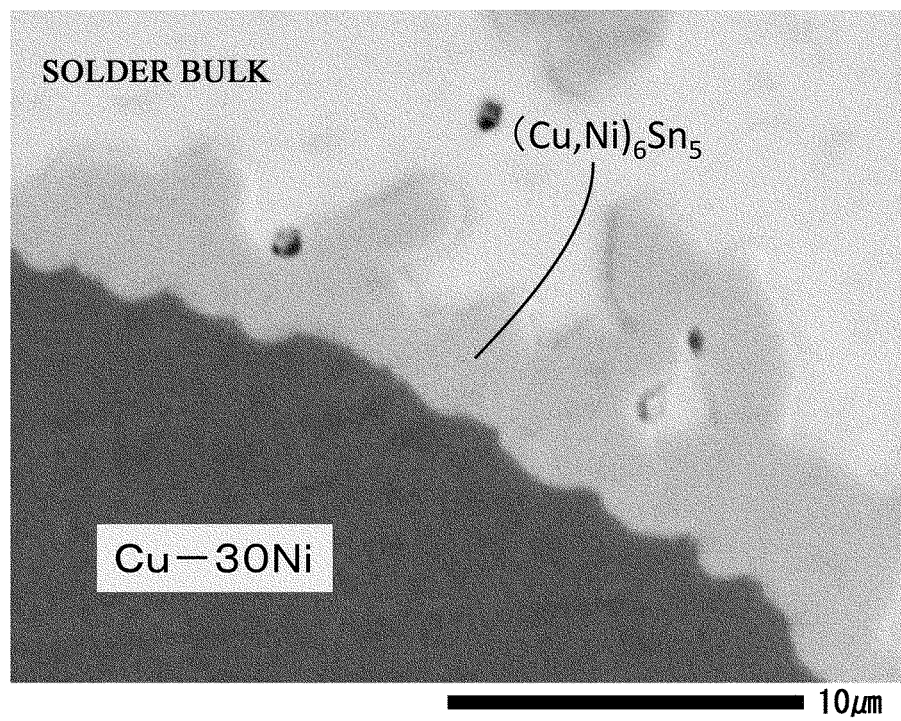
FIG. 5B is an enlarged picture (5000 magnification) of a part (squarely enclosed) of FIG. 4B.
Figure 6A:
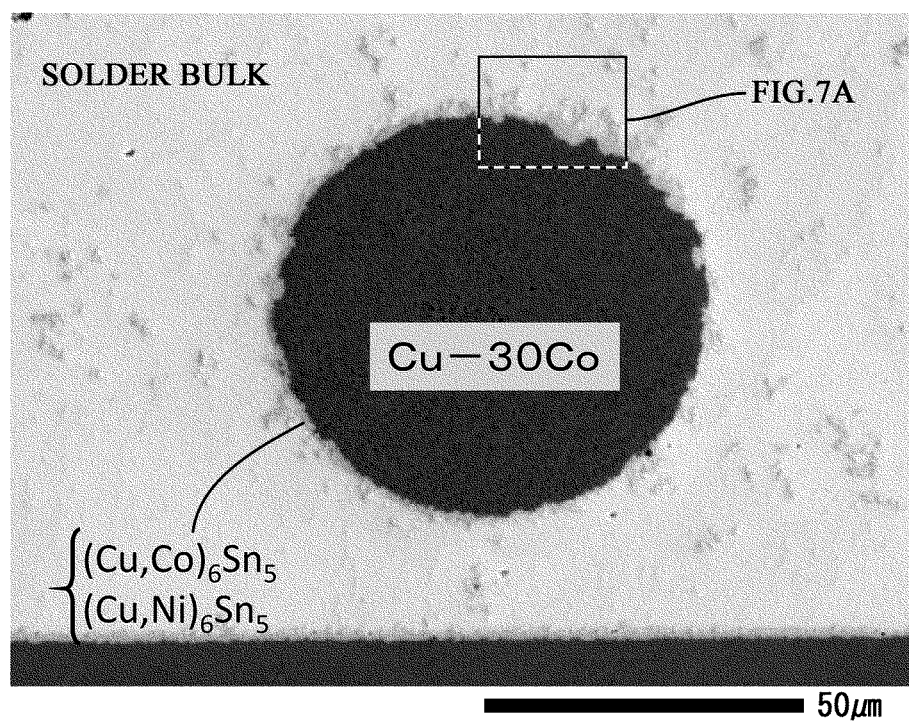
FIG. 6A is a picture, taken by SEM (900 magnification), of a part of the cross section in the thickness direction of the solder bonded body (observation sample A) including the solder bonding portion formed by using the solder paste that is obtained in Example 4.
Figure 6B:
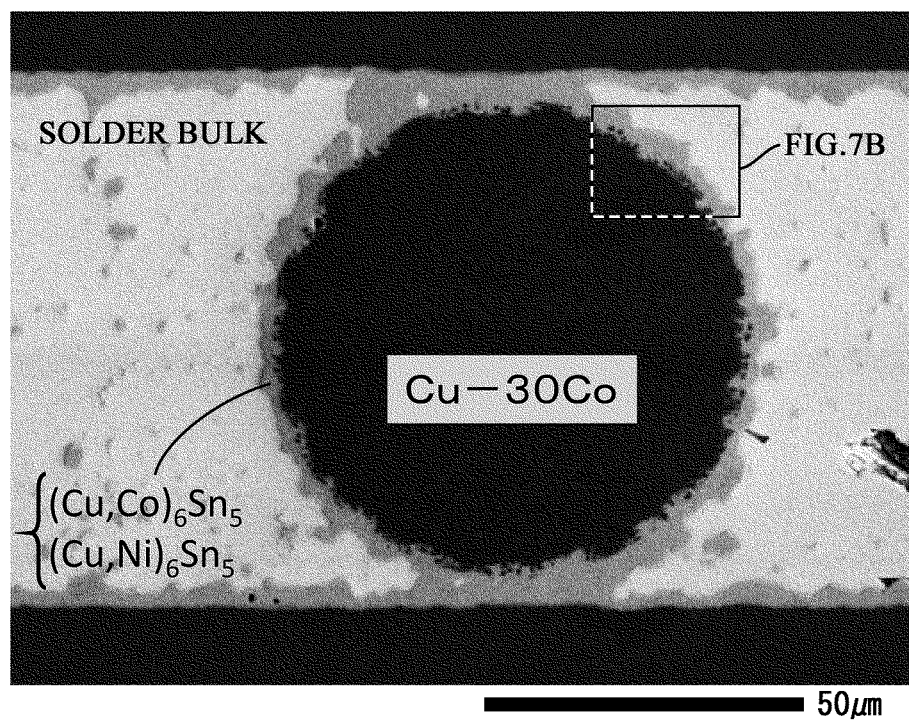
FIG. 6B is a picture, taken by SEM (900 magnification), of a part of the cross section in the thickness direction of the solder bonded body (observation sample B) including the solder bonding portion formed by using the solder paste that is obtained in Example 4.
Figure 7A:
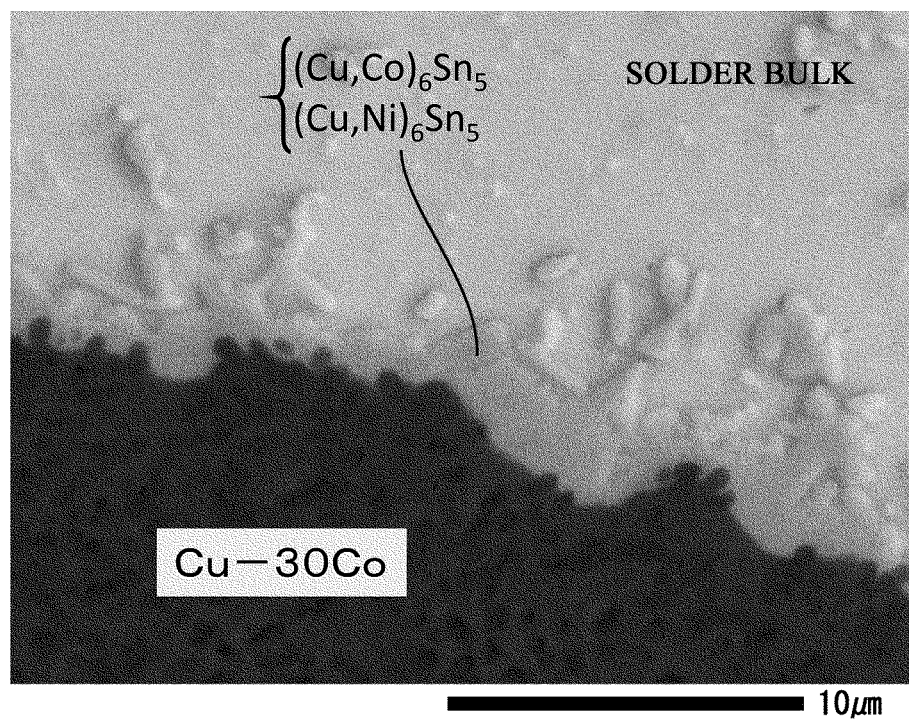
FIG. 7A is an enlarged picture (5000 magnification) of a part (squarely enclosed) of FIG. 6A.
Figure 7B:
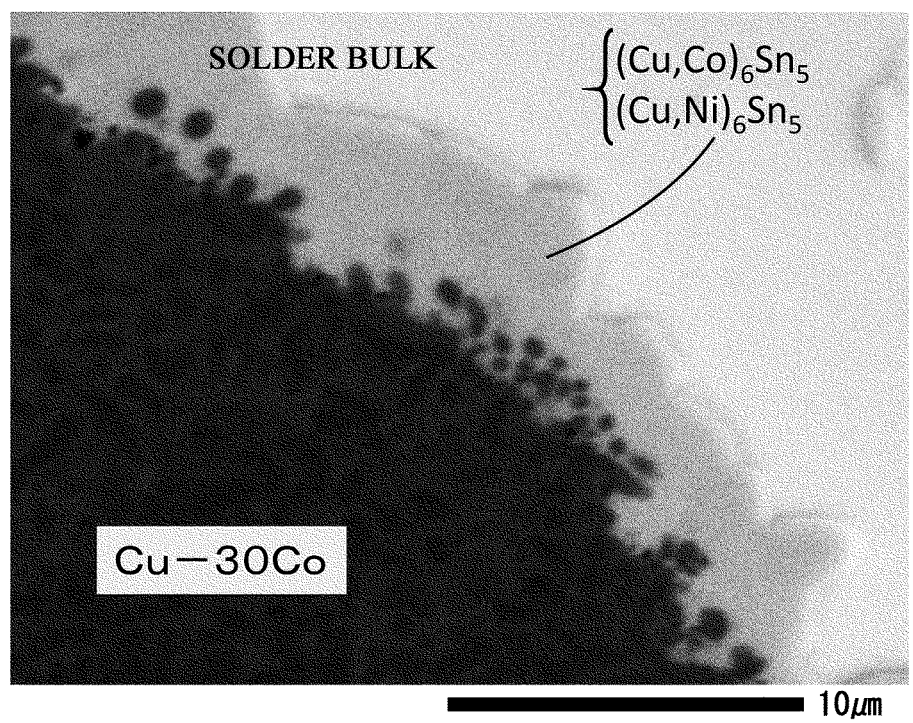
FIG. 7B is an enlarged picture (5000 magnification) of a part (squarely enclosed) of FIG. 6B.
Figure 8A:
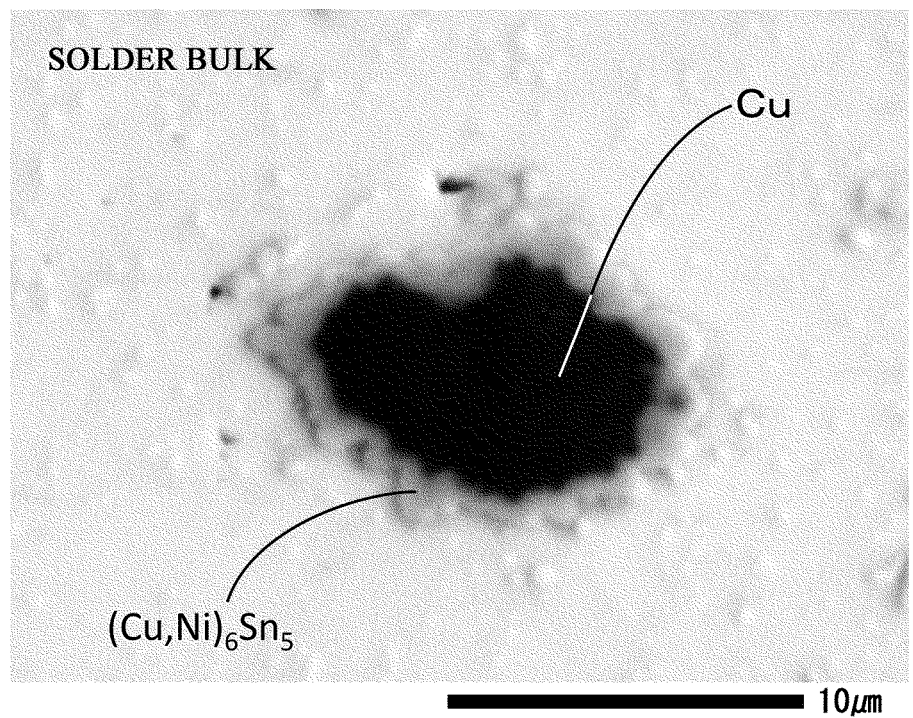
FIG. 8A is a picture, taken by SEM (5000 magnification), of a part of the cross section in the thickness direction of the solder bonded body (observation sample A) including the solder bonding portion formed by using the solder paste that is obtained in Comparative Example 1.
Figure 8B:
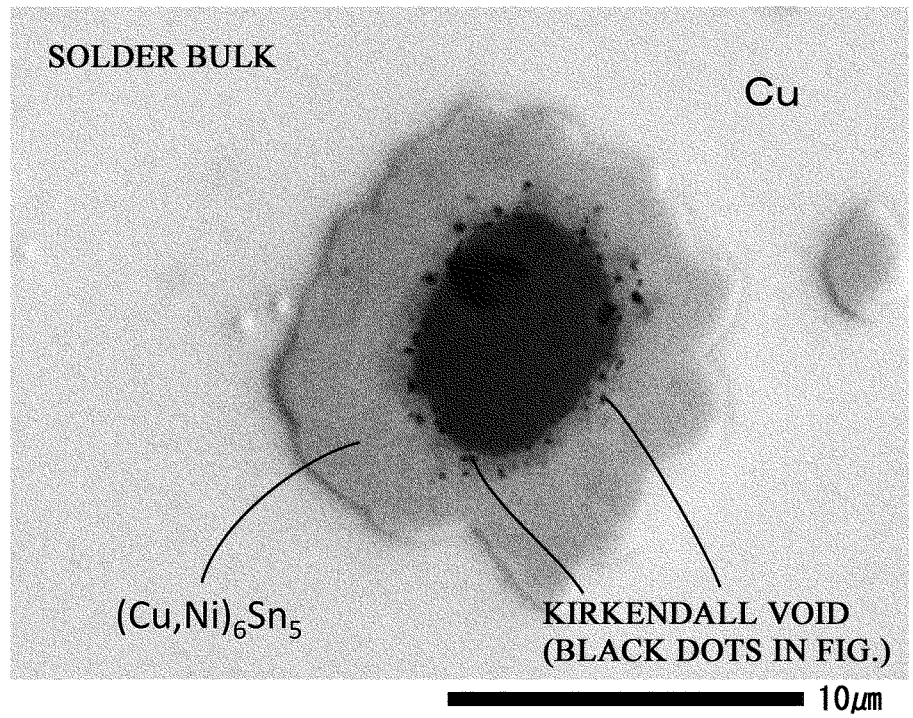
FIG. 8B is a picture, taken by SEM (5000 magnification), of a part of the cross section in the thickness direction of the solder bonded body (observation sample B) including the solder bonding portion formed by using the solder paste that is obtained in Comparative Example 1.
Figure 9A:
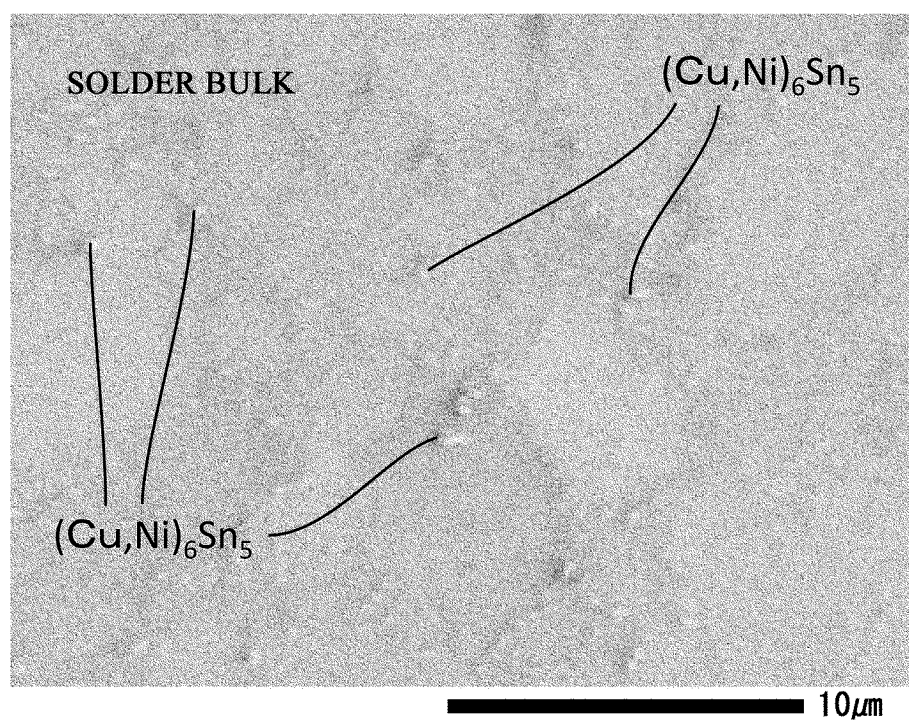
FIG. 9A is a picture, taken by SEM (5000 magnification), of a part of the cross section in the thickness direction of the solder bonded body (observation sample A) including the solder bonding portion formed by using the solder paste that is obtained in Comparative Example 2.
Figure 9B:
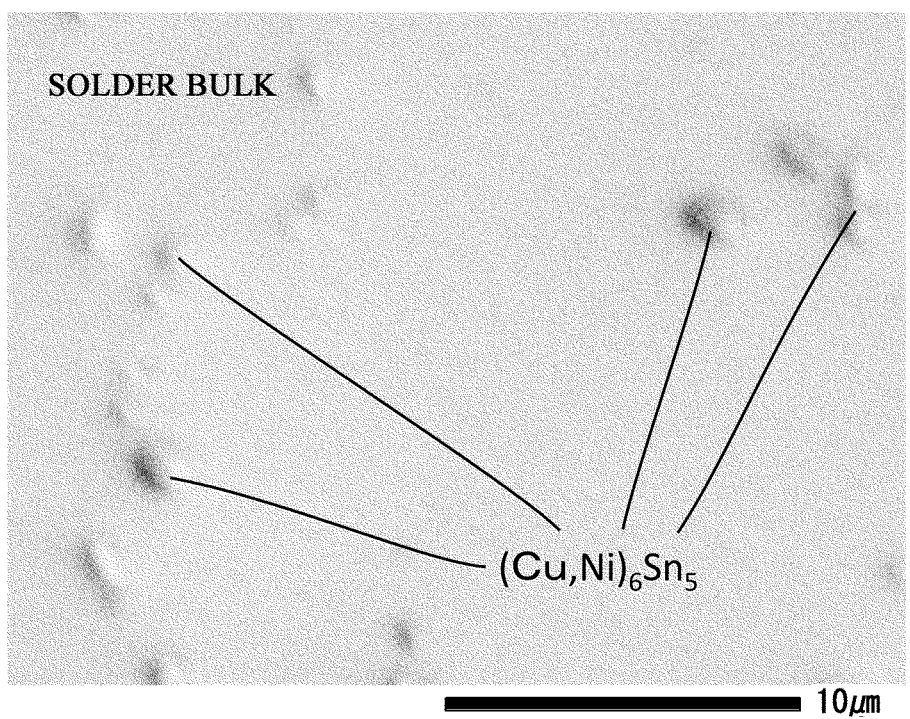
FIG. 9B is a picture, taken by SEM (5000 magnification), of a part of the cross section in the thickness direction of the solder bonded body (observation sample B) including the solder bonding portion formed by using the solder paste that is obtained in Comparative Example 2.

The solder paste thereby obtained was applied onto a ceramic substrate, and then, this was heated under a nitrogen gas atmosphere at 300° C. for 60 seconds to obtain the solder bonding portion formed by using the solder paste. The cross section in the thickness direction of the solder bonding portion thus obtained was confirmed by means of SEM. The solder bonding portion thereby obtained was formed by using the metal particle whose Cu concentration was high with the Ni content of 5.1% by mass, but as can be seen in FIG. 2, it was confirmed that the metal particles were kept in the solder alloy. Namely, it is presumed that Sn was diffused into the metal particle of the Cu—Ni alloy to form $(Cu,Ni)_6Sn_5$ in the interface between the metal particle and the solder.

Example 2

The flux agent including 1.2 parts by mass of a solvent (isobornyl cyclohexanol), 0.4 parts by mass of adipic acid, and 0.8 parts by mass of decanol was mixed with 2.0 parts by mass of the metal powder of the Cu—Ni alloy containing 5.1% by mass of Ni and 15.6 parts by mass of powder of the lead-free solder alloy mainly composed of Sn (SN100C (registered trademark); Sn—Cu—Ni type solder alloy with the composition of 0.7 Cu, 0.05 Ni, 0.005 Ge, and the balance of Sn, manufactured by Nihon Superior Co., Ltd.) to prepare the solder paste.

Example 3

The solder paste was prepared in the same way as in Example 2, except that in place of the metal powder of the Cu—Ni alloy containing 5.1% by mass of Ni, the metal powder of the Cu—Ni alloy containing 30% by mass of Ni was used.

Example 4

The solder paste was prepared in the same way as in Example 2, except that in place of the metal powder of the Cu—Ni alloy containing 5.1% by mass of Ni, the metal powder of the Cu—Co alloy containing 30% by mass of Co was used.

Comparative Example 1

The solder paste was prepared in the same way as in Example 2, except that in place of the metal powder of the Cu—Ni alloy containing 5.1% by mass of Ni, the metal powder of Cu was used.

Comparative Example 2

The flux agent including 1.2 parts by mass of a solvent (isobornyl cyclohexanol), 0.4 parts by mass of adipic acid, and 0.8 parts by mass of decanol was mixed with 17.6 parts by mass of powder of the lead-free solder alloy mainly composed of Sn (SN100C (registered trademark); manufactured by Nihon Superior Co., Ltd.) to prepare the solder paste.

Evaluation

The following evaluations were carried out by using the solder pastes prepared in Examples 2 to 4 and Comparative Examples 1 and 2.

<Shear Strength Test>
<<Preparation of Measurement Samples>>

After each of the solder pastes was applied by printing to the mounting portion of the copper foil substrate, i.e., the base material, a resistor part (R2012, length 2 mm, width 1.25 mm) was mounted to it. Then, this was subjected to reflow heating with the condition of the temperature raising speed of 1.5° C./s and the maximum temperature of 250° C. for 50 seconds for bonding. After cooled, this was cleaned with isopropyl alcohol (IPA) to remove the flux, thereby obtaining the solder bonded body in which the copper foil substrate and the resistor part were bonded through the solder bonding portion formed by using the solder paste. The solder bonded body thus obtained was designated as the measurement sample A (initial). A part of the measurement sample A was put in the chamber of the heat cycle tester (TSA-102EL-A; manufactured by Espen Corp.); then, the heat cycle test with the one cycle consisting of being kept at −40° C. for 30 minutes followed by 125° C. for 30 minutes was continuously repeated for 1000 cycles. This was designated as the measurement sample B (heat cycle).

<<Measurement of Shear Strength>>

Each of the measurement samples A and B was set to the shear testing instrument (AG-IS 10 kN, manufactured by Shimadzu Corporation), and then, the shear loading stress (N) thereof was measured at the shear speed of 0.5 mm/minute. The maximum value (Max force) in the shear loading stress was taken as the bonding strength for evaluation. The maximum value was the average value of 8 measurements for each sample. The reduction rate of the measurement values of initial and after the heat cycle (heat cycle/initial×

100) was calculated for evaluation of the effect due to the heat cycle. The results are summarized in Table 1. As can be seen from Table 1, in any of Examples, the maximum values thereof are higher than those of Comparative Examples, and in addition, the reduction rates are higher than 90%, which is significantly higher than Comparative Examples, indicating that the decrease in the bonding strength due to thermal history can be suppressed.

<<Measurement of Thermal Diffusivity>>

The thermal diffusivity of each of the measurement samples having been blackening-processed by using DGF (manufactured by Nippon Senpaku Kogu Co., Ltd.), the lubricant for formation of an aerosol-drying type graphite film, was measured at room temperature in an air atmosphere by using the laser flush analyzer LFA457 (manufactured by NETZSCH-Gerätebau GmbH). The average value with n=4 for each sample was obtained.

TABLE 1

|  |  | Example 2 | Example 3 | Example 4 | Comparative Example 1 | Comparative Example 2 |
|---|---|---|---|---|---|---|
| Metal powder composition |  | Cu—5.1Ni | Cu—30Ni | Cu—30Co | Cu | Not added |
| Max Force | Initial | 46.9 | 41.5 | 44.5 | 39.4 | 38.4 |
| [N] | Heat cycle | 44.0 | 37.9 | 42.7 | 31.2 | 27.9 |
| Reduction rate (%) |  | 94 | 91 | 96 | 79 | 73 |

<Measurement of Thermal Conductivity>
<<Preparation of Measurement Sample>>

An appropriate amount of each of the solder paste was put on an alumina plate (5 cm long, 5 cm wide, 500 μm thick), and from above it, sandwiched with an alumina plate (5 cm long, 5 cm wide, 500 μm thick) via a spacer having the thickness of 120 μm, and then, this was placed on a hot plate. Next, this was heated on a hot plate at 250° C. with applying, from the upper direction of the alumina plate, the load of 0.5 atm by using a pressurizing device. After confirming that the solder paste was melted and leaked to the outside of the alumina plate, heating was stopped. Next, after cooling by using a local blower and confirming that the solder was solidified, the pressurized state was released. Thereafter, the alumina plate was removed and then cleaned with IPA to remove the flux, thereby obtaining the solder alloy sheet having the solder paste melted by the heat-treatment and containing the metal particle, as the measurement sample.

<<Measurement of Density>>

In accordance with the Archimedes method, each of the measurement samples was sunk into water in the container whose inner diameter is the same as that of the sample; then, the volume of the sample was measured by the change in the liquid level before and after sinking of the sample. The density thereof was calculated from the sample weight.

<<Measurement of Specific Heat>>

The specific heat of each of the measurement samples was measured by using sapphire as the standard substance under an argon atmosphere at room temperature with the DSC method using the differential scanning calorimeter DSC3500 (manufactured by NETZSCH-Gerätebau GmbH).

<<Calculation of Thermal Conductivity>>

The thermal conductivity of each of the measurement samples was calculated by using the following formula from the density, the specific heat, and the thermal diffusivity, these having been obtained as described above.

Thermal Conductivity (W/(m·K))=Thermal Diffusivity (m²/s)×Density (Kg/m³)×Specific Heat (J/(Kg·K))

The results obtained above are summarized in Table 2. As can be seen in Table 2, the thermal conductivities of Examples 2 to 4 are significantly better than that of Comparative Example 2 in which the metal particle is not added. It can also be seen that these have the thermal conductivity comparable to that of Comparative Example 1 using copper, which generally has excellent thermal conductivity.

TABLE 2

|  | Metal powder composition | Metal particle content [%] | Density [kg/m³] | Specific heat [J/(kg · K)] | Thermal diffusivity [m²/s] | Thermal conductivity [W/(m · K)] | Ratio to Comparative Example 2 |
|---|---|---|---|---|---|---|---|
| Example 2 | Cu—5.1Ni | 10 | $7.5 \times 10^3$ | 235 | $80.8 \times 10^{-6}$ | 143 | 2.13 |
| Example 3 | Cu—30Ni | 10 | $7.5 \times 10^3$ | 235 | $80.5 \times 10^{-6}$ | 141 | 2.10 |
| Example 4 | Cu—30Co | 10 | $7.5 \times 10^3$ | 235 | $80.5 \times 10^{-6}$ | 139 | 2.07 |
| Comparative Example 1 | Cu | 10 | $7.5 \times 10^3$ | 236 | $91.1 \times 10^{-6}$ | 161 | 2.40 |
| Comparative Example 2 | Not added | — | $7.4 \times 10^3$ | 219 | $41.4 \times 10^{-6}$ | 67.1 | 1.00 |

<Observation of Cross-Sectional Structure of Solder Bonded Body>
<<Preparation of Measurement Samples>>

After 0.3 g of each of the solder pastes was applied in the center of the copper plate 1 (made of oxygen-free copper, width 5 mm×length 5 mm×thickness 0.5 mm), this was sandwiched by the copper plate 2 (made of oxygen-free copper, width. 5 mm×length 5 mm×thickness 0.5 mm). Then, after this was subjected to reflow heating with the condition of the temperature raising speed of 1.5° C./s and the maximum temperature of 250° C. for 50 seconds for bonding, this was cooled to obtain the solder bonded body in which the copper plate 1 and the copper plate 2 were bonded via the solder bonding portion formed by using the solder paste. The solder bonded body thus obtained was designated as the observation sample A. Then, a part of the observation sample A was statically placed in an oven. (MO-931, manufactured by Toyama Sangyo Co., Ltd.) at 150° C., and whereby the aging test thereof was carried out by keeping this condition for 100 hours. This was designated as the observation sample B (aging). After cutting the observation samples A and B in the thickness direction and cross-sectional polishing, the cross sections thereof were photographed with a scanning electron microscope (JSM-6360LA, manufactured by JEOL Ltd.) (hereinafter, this is referred to as SEM). The acquired pictures are illustrated in FIG. 3A to FIG. 10B. In the cross-sectional polishing of the observation samples A and B, polishing was carried out step by step so that the median value of the added particles was successfully observed and evaluated. The observation was made where the diameter was maximum.

As can be illustrated in FIG. 3A to FIG. 7B, it can be seen that, in the case of the solder paste containing the prescribed metal particle, under the general reflow condition, around the surface thereof, $(Cu,Ni)_6Sn_5$ is, or $(Cu,Ni)_6Sn_5$ and $(Cu,Co)_6Sn_5$ are formed; and in the case that the thermal history is applied, around the surface of the metal particle, $(Cu,Ni)_6Sn_5$ is, or $(Cu,Ni)_6Sn_5$ and $(Cu,Co)_6Sn_5$ are further formed (Examples 3 and 4), or the particle of $(Cu,Ni)_6Sn_5$ is formed (Example 2). On the other hand, as can be illustrated in FIG. 8B, in the case of Comparative Example 2 containing the metal particle of Cu, formation of the Kirkendall void is observed when the thermal history is applied. Thus, when the metal particle of the Cu—Ni alloy or of the Cu—Co alloy is included, unlike the metal particles of Cu alone, a stable intermetallic compound without the Kirkendall void can be formed.

Accordingly, it can be seen that because the solder bonding portion formed by using the solder paste of Examples contains the specific metal particle, $(Cu,Ni)_6Sn_5$ is, or $(Cu,Ni)_6Sn_5$ and $(Cu,Co)_6Sn_5$ are stably formed, and generation of the void is suppressed; thus, even after the heat load is repeated, not only the shear strength superior to Comparative Example 1 that formed the Kirkendall void can be obtained, but also the thermal conductivity comparable to Comparative Example 1, which that uses the metal particle of copper, can be obtained. In addition, because generation of the void after repeated thermal load is suppressed, together with the characteristic of $(Cu,Ni)_6Sn_5$ and $(Cu,Co)_6Sn_5$ that the phase change does not take place, the decrease in the durable reliability that is caused by concentration of the strain and stress thereby leading to formation of the crack can be suppressed.

REFERENCE SIGNS LIST

1 Solder bonding portion formed by using solder paste
2 Lead-free solder
3 Metal particle
4 $(Cu,Ni)_6Sn_5$
10 Solder bonded body
A, B Substrate

The invention claimed is:

1. A solder paste comprising powder of a lead-free solder alloy mainly comprising Sn and metal particles with a melting point higher than a melting point of the lead-free solder alloy, wherein the metal particles are an alloy consisting of Cu—Co having a Co content of 20 to 40% by mass.

2. The solder paste of claim 1 wherein the Co content is 20 to 35% by mass.

3. The solder paste of claim 1 wherein the metal particles have an average particle diameter of 5 μm or greater.

4. The solder paste of claim 1 wherein the metal particles have an average particle diameter of 10 μm or greater.

5. The solder paste of claim 1 wherein an intermetallic compound comprising $(Cu,Co)_6Sn_5$ is formed when the solder paste is heated to a molten state.

6. The solder paste of claim 2 wherein the intermetallic compound does not undergo η-η' phase change at 186° C.

7. The solder paste of claim 2 wherein an intermetallic compound comprising $(Cu,Co)_6Sn_5$ is formed when the solder paste is heated to a molten state.

* * * * *